(12) United States Patent
Giehl (10) Patent No.: US 7,331,745 B2
(45) Date of Patent: Feb. 19, 2008

(54) NUT

(76) Inventor: Arno Giehl, Bismarckstrasse 15, 50996 Koeln (DE)

( * ) Notice: Subject to any disclaimer, the term of this patent is extended or adjusted under 35 U.S.C. 154(b) by 0 days.

(21) Appl. No.: 10/276,449

(22) PCT Filed: May 16, 2001

(86) PCT No.: PCT/DE01/01838

§ 371 (c)(1),
(2), (4) Date: Mar. 26, 2003

(87) PCT Pub. No.: WO01/88390

PCT Pub. Date: Nov. 22, 2001

(65) Prior Publication Data

US 2003/0156922 A1    Aug. 21, 2003

(30) Foreign Application Priority Data

May 16, 2000  (DE) ................................. 100 23 675

(51) Int. Cl.
*F16B 37/08* (2006.01)
(52) U.S. Cl. ...................................... 411/433; 411/267
(58) Field of Classification Search ................ 411/267, 411/433, 237, 432, 434, 266
See application file for complete search history.

(56) References Cited

U.S. PATENT DOCUMENTS

| | | | |
|---|---|---|---|
| 3,312,264 A | 4/1967 | Dresdner | |
| 3,352,341 A * | 11/1967 | Schertz | 411/270 |
| 4,378,187 A | 3/1983 | Fullerton | |
| 5,154,560 A * | 10/1992 | Copito | 411/266 |
| 5,340,252 A | 8/1994 | Weddendorf | |
| 5,826,847 A | 10/1998 | Warner et al. | |
| 6,053,655 A * | 4/2000 | Mazhar | 403/320 |
| 6,062,784 A * | 5/2000 | Wisser et al. | 411/267 |
| 6,974,291 B2 * | 12/2005 | Li | 411/437 |

\* cited by examiner

*Primary Examiner*—William L. Miller
(74) *Attorney, Agent, or Firm*—Fulwider Patton LLP (57) ABSTRACT

An outer body of a nut defines an axial port and carries initial guide means. An inner body, movably accepted in the port in the axial direction, is divided into at least two jaws in the axial direction, which carry respectively an internal thread segment on their inner radial area. The jaws also include second guide means which interact with the first guide means in such a way that the jaws, when the outer body is moved relative to the inner body in a loosening direction, are moved radially outwards, and if the outer body is moved relative to the inner body in a tightening direction, are moved radially inwards. As the jaws can be moved when movement is in the radial direction, their internal thread segments can be brought smoothly into engagement with the outer thread of a threaded rod.

10 Claims, 9 Drawing Sheets

NUT

RELATED APPLICATIONS

This application claims the benefit of PCT International Application Serial No. PCT/DE01/01838, filed May 16, 2001 which claims the benefits of German Utility Model Application Serial No. 100 23 675.8, filed May 16, 2000.

BACKGROUND OF THE INVENTION

1. Field of the Invention

The invention relates in general to a fast mounting nut.

2. Description of the Related Art

A type of fast mounting nut is known from DE 40 24 784 A1. With this known nut an axial port of an outer body, which is described therein as an outside member, is a hexagonal inner borehole with a foremost region, which has constant internal dimensions in the axial direction, as well as an attaching conical region, which approaches the axis in the loosening direction of the nut.

The jaws of this known nut, which is described therein as internal nut segments, have respectively a front section which bears the respective internal thread segment, and a rearward section connecting in one piece to it. This rearward section is shaped similar to the front section, but relative to this is bent slightly outwards and, instead of the internal thread segment, has a threadless recess whose internal dimensions are larger than the internal thread segment.

The jaws are pivotally supported on one another at the transition point between the front section and the rearward section. If the outer body is now moved forward relative to the inner body, in other words in the tightening direction of the nut, then the jaws are swivelled towards one another in such a way that the front sections fold up, are closed in other words, so that the internal thread segments in the front sections form the internal thread of the nut. In this closed state of the nut the outer body sits on the front sections, whilst the rearward sections swing open.

If, on the other hand, the outer body is moved rearward relative to the inner body, in other words in the loosening direction of the nut, onto the opened, rearward sections, then the jaws are swivelled toward one another in such a way that the rearward sections are folded up, so that the front sections, which are of course connected in one piece to the rearward sections, are taken along and opened. In this opened state of the nut the internal thread is thus expanded, as the internal thread segments are opened, so that these no longer engage with a threaded rod which is guided through the nut. Furthermore, the recesses in the rearward sections now form a cavity through which such a threaded rod can be pushed.

A similar nut is known from FR 2 640 336 A1. Even with this nut the jaws are pivotally supported on one another, although with this nut the rearward sections bear the internal thread segments, whilst the front sections have the threadless recess. This nut is therefore closed when the outer body is moved in the loosening direction relative to the inner body, and opened, when the outer body is moved relative to the inner body in the tightening direction.

Both the known nut in accordance with DE 40 24 784 A1 and the known nut in accordance with FR 2 640 336 A1 have, on the one hand, the advantage that the inner body is clearly longer than the inner thread, as the sections with the threadless recess connect respectively and in one piece with the sections which bear the internal thread segments. These latter sections with the threadless recess cannot be dispensed with, however, as they are required to open the sections with internal thread segment. The known nuts are therefore necessarily longer than their internal thread.

The known nuts have, on the other hand, the disadvantage that it is relatively difficult, to open and close the jaws, when the screw sits on a threaded rod. This is because each internal thread segment relative to the outer thread of the threaded rod is rotated around an axis during the folding movement, this axis being located at right angles to the longitudinal axis, so that the threads interlock easily.

Hence, those skilled in the art have recognized a need a fast mounting nut which is shorter for the same length of the internal thread and which can be opened and closed more easily. The invention fulfills these needs and others.

SUMMARY OF THE INVENTION

Briefly, and in general terms, the invention is directed to a nut having an outer body which defines an axial port and carries initial guide means. The nut also includes an inner body, that is movably accepted in the port in the axial direction. The inner body is divided into at least two jaws in the axial direction, which carry respectively an internal thread segment on their inner radial area. The jaws also include second guide means which interact with the first guide means in such a way that the jaws, when the outer body is moved relative to the inner body in a loosening direction, are moved radially outwards, and if the outer body is moved relative to the inner body in a tightening direction, are moved radially inwards. As the jaws can be moved when movement is in the radial direction, their internal thread segments can be brought smoothly into engagement with the outer thread of a threaded rod.

As, with this nut, the jaws are moved in a radial direction when they are opened and closed, their internal thread segments can be brought smoothly into engagement with the outer thread of a threaded rod and can be just as easily moved away from this again. Moreover, as the jaws do not require any sections which have a thread-free recess, their length need only correspond to the desired length of the internal thread. This nut in the closed state is therefore not longer than a conventional one-piece nut.

Further features and embodiments of the invention are described in the sub-claims. For example, it can be provided that the second guide means comprise grooves which run in the lateral areas of the jaws and detach themselves from the axis in the tightening direction and that the first guide means comprise noses, which project from the port and run in the grooves. As the grooves in the tightening direction detach themselves from the axis, the jaws are moved radially inward, when the outer body in the tightening direction is pushed onto the inner body, and pushed radially outwards, when the outer body in the loosening direction is pulled away from the inner body.

An outer wedge surface can also be provided on each jaw, which wedge surface detaches itself in the tightening direction from the axis, and on the port for each jaw an inner wedge surface is provided which moves away from the axis in the direction of tightening and corresponding to the assigned outer wedge surface. The jaws can also be pre-stressed radially outwards.

A locking pin can also be provided, which is movably guided diagonally to the axis through the outer body and in its locking position with its inner end abuts a locking surface, which is provided on at least one jaw diagonally to the axis in the tightening direction, and in its release position can be moved with its inner end past this locking surface and together with the outer body in the loosening direction.

In one configuration the outer end of the locking pin in the locking position projects from the outer peripheral surface of the outer body and the inner end of the locking pin and the locking surface are formed so that the locking pin can be brought out of the locking position into the release position by pressing in. A further preferred provision is for the locking pin to be pre-stressed in the locking position.

These and other aspects and advantages of the invention will become apparent from the following detailed description.

DETAILED DESCRIPTION OF THE PREFERRED EMBODIMENTS

FIGS. 1 to 4 show a nut in an initial embodiment. In accordance with FIGS. 1 and 2 the nut 10 is in an opened state, i.e., with no thread engagement, so that it may be move along the threaded shaft 12 of a screw guided through two items 14 to be screwed together. The nut may be pushed in either a tightening direction toward the two items 14 (to the left in FIG. 1) or a loosening direction away from the two items 14 (to the right in FIG. 1).

The nut 10 has an outer body 16 and two jaws 18, 20. The outer body 16 has an axial port 22, in which the jaws 18, 20 are movably accepted in the axial direction, as described in detail below. The port 22 here has a square cross-section and runs coaxially to the longitudinal axis A of the nut 10. Here, the jaws 18, 20 are square-shaped blocks, whose length corresponds to the length of the outer body 16 and whose width is slightly less than the width of the port 22, as can be seen in FIG. 2, so that they sit so they do not twist in the port 22. Each jaw 18, 20 has on its radially inner surface, i.e., the surface which faces the threaded shaft 12, an internal thread segment which is formed so that it fits the outer thread of the threaded shaft 12. As a result, the upper jaw 18 shown in FIGS. 1 and 2 has its internal thread segment 24 on its underside, whereas the lower jaw 20 bears its internal thread segment 24 on its upper side.

As can be seen in FIG. 2, the two jaws 18, 20 are distributed symmetrically around the longitudinal axis A and therefore also around the threaded shaft 12, so that they are at an angular distance of 180° to one another. This arrangement also applies accordingly to other embodiments (not shown) of the nut 10, more than two jaws being provided in these cases. In the case of three jaws these are then preferably arranged at an angular distance of 120° to one another around the longitudinal axis A.

With reference to FIG. 2, initial guide means are provided on the outer body 16, which comprises four noses 26 which project from the port 22. Here two noses 26 are arranged respectively on the left hand side and on the right hand side of the port 22 at the same distance above and below the longitudinal axis A. The noses 26 are formed by the inner end of pins which are pushed into ports 28 in the outer body 16 from the outside.

Figure 1:
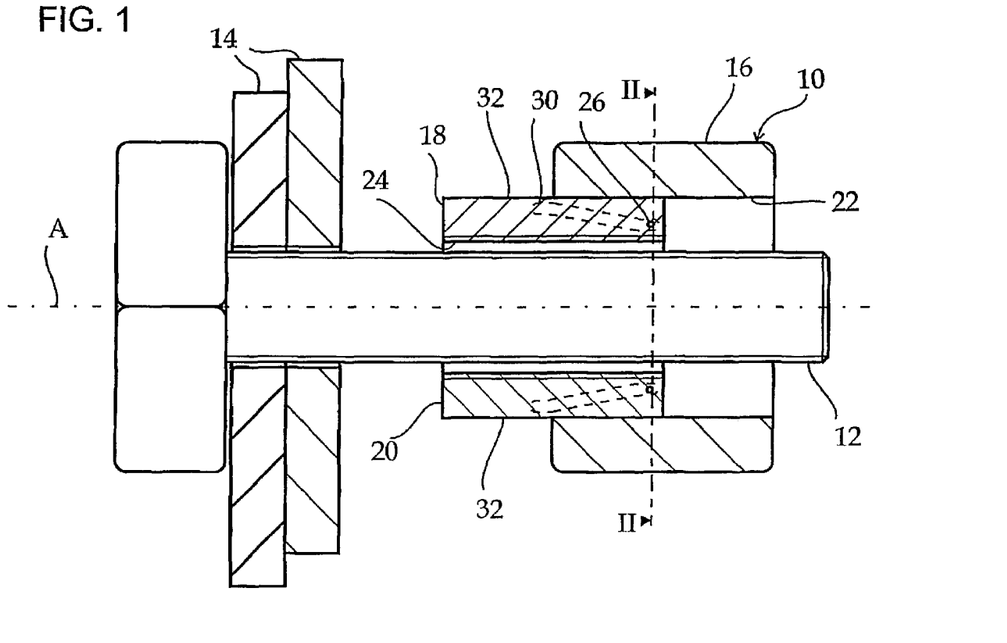
FIG. 1 is a cut lateral view of a nut in an initial embodiment with the jaws opened.
Figure 2:
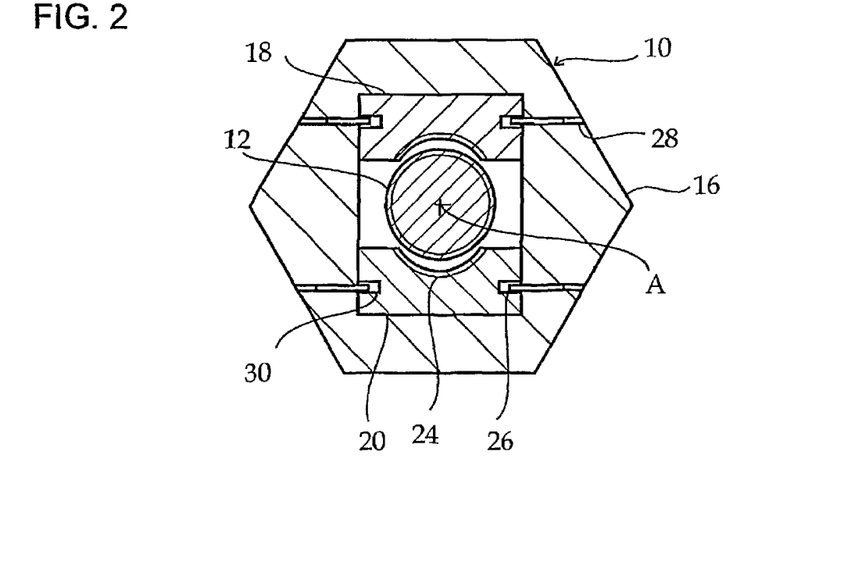
FIG. 2 is a cross-section along the line II-II in FIG. 1.
Figure 5:
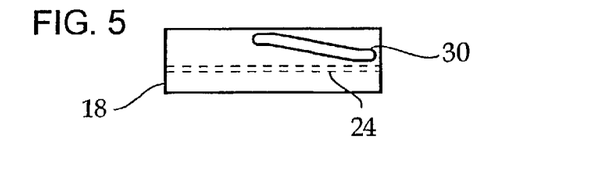
FIG. 5 is a lateral view of a jaw in the initial embodiment for the nut in FIGS. 1 to 4.

Matching these initial guide means on the outer body 16 are two guide means provided on the jaws 18, 20 as shown in FIGS. 1, 2 and 5. The guide means comprise four grooves 30, in which one of the noses 26 runs respectively. Each jaw 18, 20 has on its left-hand lateral surface shown in FIG. 2 a groove 30 and another groove 30 symmetrical to this in its right-hand lateral surface. Each groove 30 distances itself here as shown in FIGS. 1 and 5 in the tightening direction from the longitudinal axis A, so that its distance to the longitudinal axis A in FIG. 1 is greater on the left hand side than on the right hand side. Each groove 30 therefore runs essentially axially in a plane parallel to and at a distance from the longitudinal axis A. Although the grooves are straight here, they may also be bent in an axial direction.

The method of operation of the nut 10 is described in the following with reference to FIGS. 1 to 4. In FIGS. 1 and 2 the nut is shown in the opened state, in which the jaws, 18, 20 are spaced so far apart, that their internal thread segments 24 do not engage with the outer thread of the threaded shaft 12. The nut 10 in this opened state can therefore be drawn quickly to the right in FIG. 1, in the loosening direction in other words, off the threaded shaft 12, without it having to be rotated around its longitudinal axis A, as is the case with a conventional, one-piece nut. The nut 10 can also be pushed to the left, in the tightening direction in other words, onto the threaded shaft 12 quickly, without having to be rotated.

As can be seen clearly in FIG. 1, the outer body 16 is pushed relative to the jaws 18, 20 in the direction of loosening as far as the stop of the noses 26 at the right hand end of the grooves 30, so that the jaws 18, 20 are only inserted approximately halfway into the port 22. As each groove 30 is with its right hand end closer to the longitudinal axis A than with its remaining course, the jaws 18, 20 are moved apart so that their internal thread segments 24 do not engage with the threaded shaft 12.

As the height of the jaws 18, 20 is selected so that with their radially outer surface 32, which is its upper side in the case of the upper jaw 18 and in the case of the lower jaw 20 its underside, in this opened state of the nut 10 abuts the upper respectively lower surface of the port 22, they are prevented from tipping downward around the noses 30 and the left hand lower edge of the jaw 18 and the right hand upper edge of the lower jaw 20 abut the threaded shaft 12.

In order to close the nut 10 this is pushed out of the position shown in FIG. 1 until the jaws 18, 20 push with their left hand face surfaces against the items 14 to be connected. If the outer body 16 is pushed further to the left relative to the threaded shaft 12, it is now also pushed to the left relative to the jaws 18, 20 and therefore, as this can no longer go round to the side, pushed onto it. As the outer body 16 is now pushed relative to the jaws 18, 20 in the tightening direction, the noses 26 run in the grooves 30 in the tightening direction as well, so that the jaws 28, 20 are pushed radially inwards and therefore closed. As the jaws 18, 20 are moved radially inwards, in other words towards the threaded shaft 12, the full length of their internal thread segments 24 engages evenly with the outer thread of the threaded shaft 12. In this way the internal thread segments 24 are prevented from interlocking and jamming with the outer thread through diagonal seating of the jaws 18, 20 on the threaded shaft 12. Otherwise there is the risk that the nut 10 cannot be fully closed or, if this is nevertheless achieved with excessive force, that the threads of the threaded shaft 12 and/or of the jaws 18, 20 are damaged.

Figure 3:
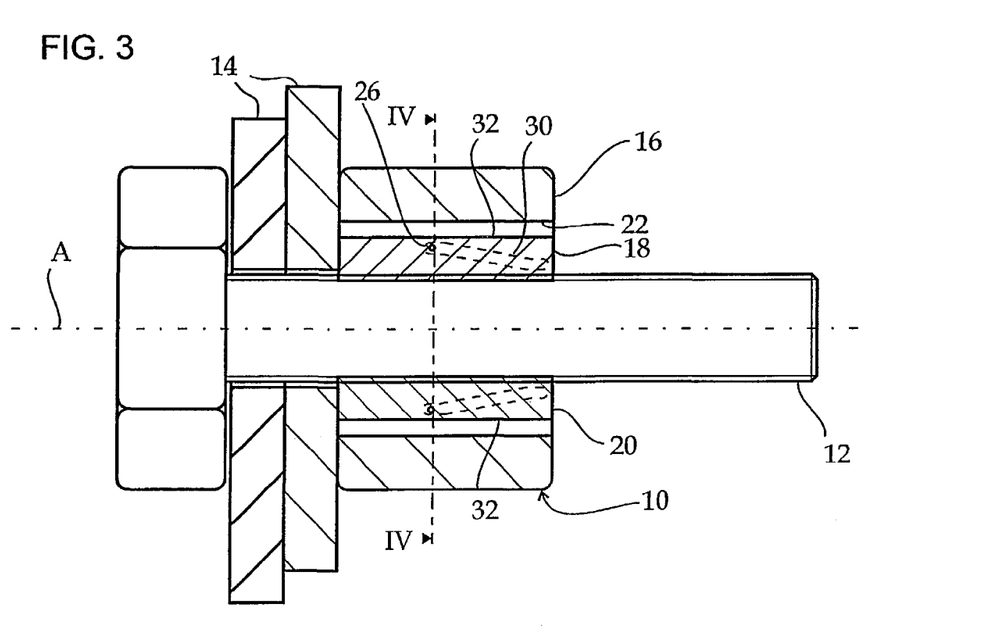
FIG. 3 shows the nut from FIG. 1 with the jaws closed.
Figure 4:
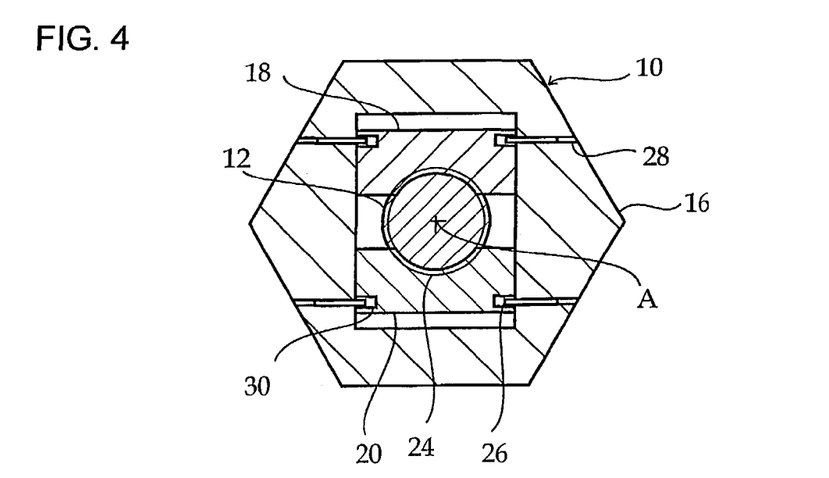
FIG. 4 is a cross-section along line IV-IV in FIG. 3.

If the outer body 16 is pushed fully onto the jaw 18, 20, then the nut 10 is in the closed state as shown in FIGS. 3 and 4. As can be seen clearly in FIG. 3 the noses 26 then sit in the left hand end of the grooves 30, so that the internal thread segments 24 together form one part of an inner thread, which matches the outer thread of the threaded shaft 12, as can be seen clearly in FIG. 4. The jaws 18, 20 therefore together form an inner body, which is accepted so that it cannot twist in the port 22 and movably in an axial direction as required by a nut 10. On the contrary it can be said that the inner body is divided into two jaws 18, 20 in an axial direction.

If the nut is in the closed state shown in FIGS. 3 and 4, it can be tightened like a conventional, single-piece nut, as the inner body 18, 20 sits so that it cannot twist in the port 22.

So that the outer body 16 does not slip accidentally relative to the inner body in the loosening direction, which can occur, for example, if the screw connection of nut 10 and threaded shaft 12 is exposed to vibrations, the grooves 30 may have a section on their left hand end which section runs parallel to the longitudinal axis A only when connected to this parallel section in the loosening direction, in other words approaches the longitudinal axis A rightwards. This can be seen particularly clearly in FIG. 5. In order to loosen the jaws 18, 20, the outer body 16 must therefore be pushed relative to these in the loosening direction, until the noses 26 arrive at the right hand of this parallel section of the grooves. Only when the outer body 16 is then pushed further in the loosening direction, do the noses 26 run in the oblique groove sections, so that the jaws 18, 20 are pushed radially outwards. As a result, the engagement of the internal thread segments 24 with the outer thread of the threaded shaft 12 continues to loosen until the outer body ultimately 16 is pushed relative to the inner body 18, 20 in the loosening direction until the noses 26 strike at the right hand end of the grooves 30. The nut 10 has then again assumed the opened state, in which the jaws 18, 20 do not engage with the threaded shaft 12, so that the nut 10 can be quickly pulled away the threaded shaft 12 again.

Figure 6:
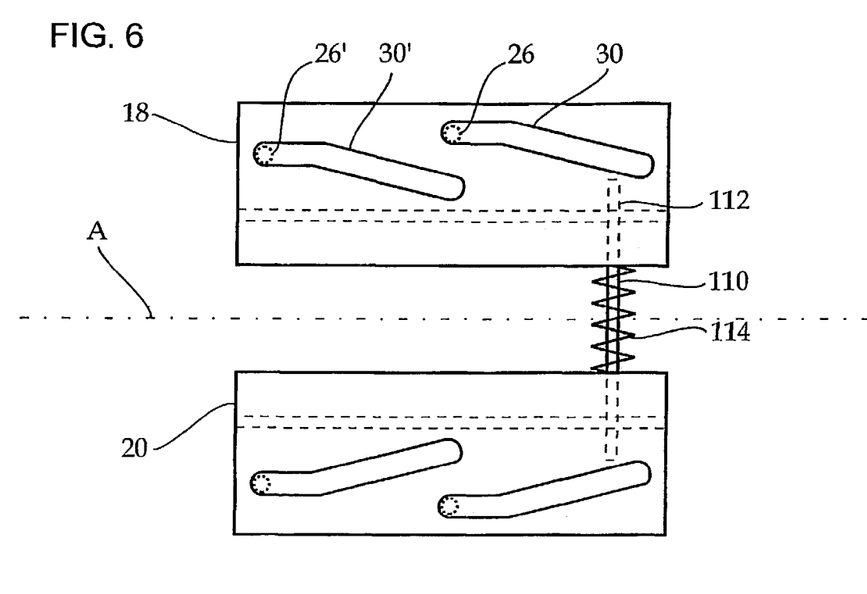
FIG. 6 is a lateral view of two jaws in a second embodiment.
Figure 7:
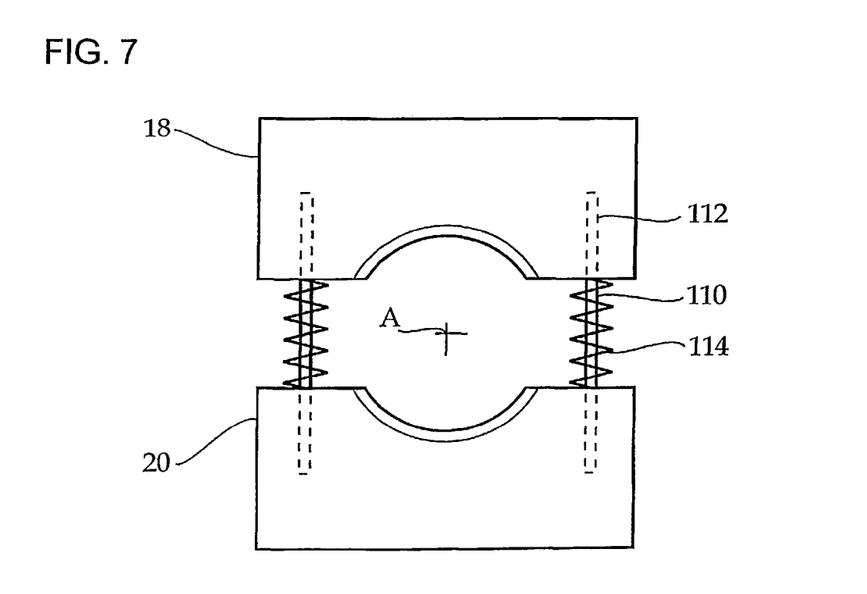
FIG. 7 is a front view of FIG. 6.

Two jaws 18, 20 are shown in a second embodiment in FIGS. 6 and 7. Here and to the left next to each groove 30 a second groove 30' is provided. Accordingly, the outer body 16 to the left in FIGS. 1 to 4 have next to each nose 26 (shown as a dotted line) a second nose 26' as well (shown as a dotted line), which runs in the second groove 30'. This causes the jaws 18, 20 to be held as parallel as possible to the longitudinal axis A.

Also provided in this second embodiment are means which prevent the jaws 18, 20 from being moved axially relative to one another, if the outer body is pushed onto them or pulled away from them. Such means are also suitable for all other embodiments of the jaws. These means comprise here, for example, two guide roads 110 which are arranged on the right hand end of the jaws 18, 20 in FIGS. 6 and 7 to the left and right next to the longitudinal axis A and seat respectively movably in two opposing guide boreholes 112 in the jaws 18, 20. The jaws 18, 20 can therefore for opening and closing as desired be moved radially relative to one another but not axially. The means may also comprise fewer or more than two guide rods 110.

Furthermore, the jaws 18, 20 are pre-stressed radially outwards by two helical springs 114 which respectively comprise a guide rod 110 and are supported on the underside of the lower jaw 18 and on the upper side of the lower jaw 20. As a result, the opening of the jaws 18, 20 is supported when the outer body 16 is pulled away.

Figure 8:
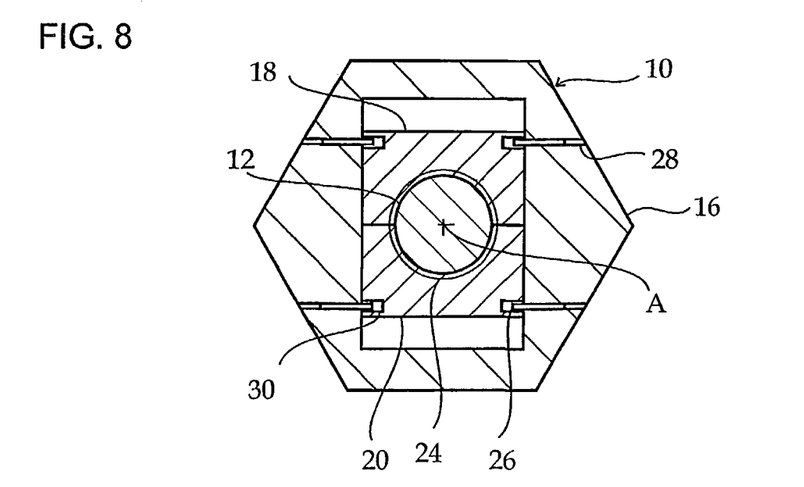
FIG. 8 is a cross-section through a nut with jaws in a third embodiment.

In contrast to the form of the jaws 18, 20 shown in FIGS. 1 to 7 these may of course also be formed so that they form a complete inner thread when closed, as shown in the third embodiment of the jaws 18, 20 in accordance with FIG. 8.

Figure 9:
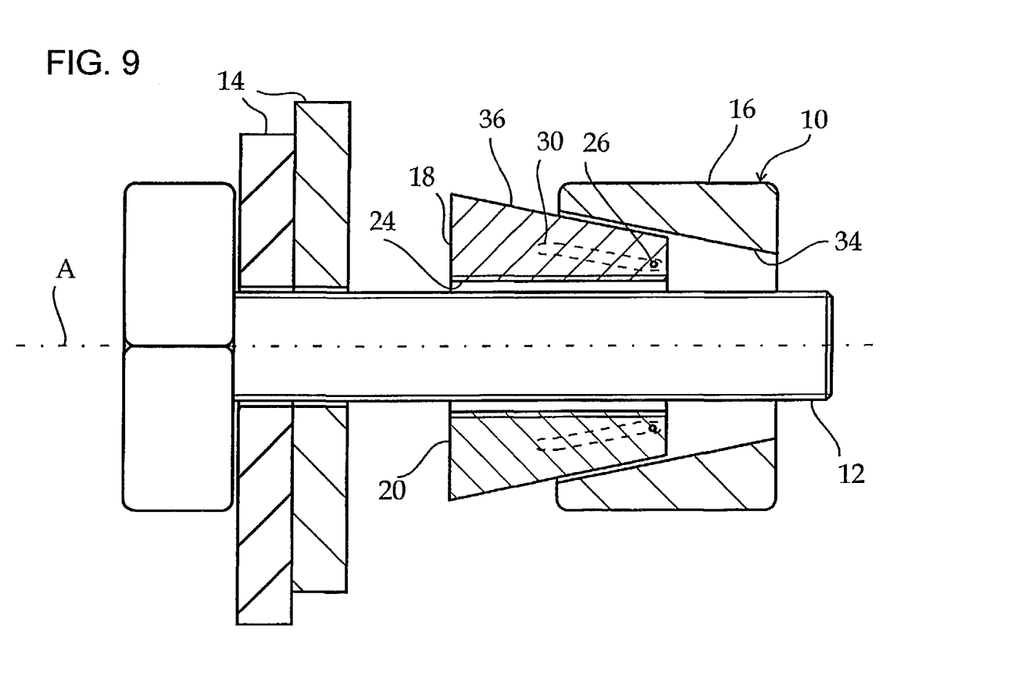
FIG. 9 is a cut lateral view of a nut in a second embodiment with the jaws opened.
Figure 10:
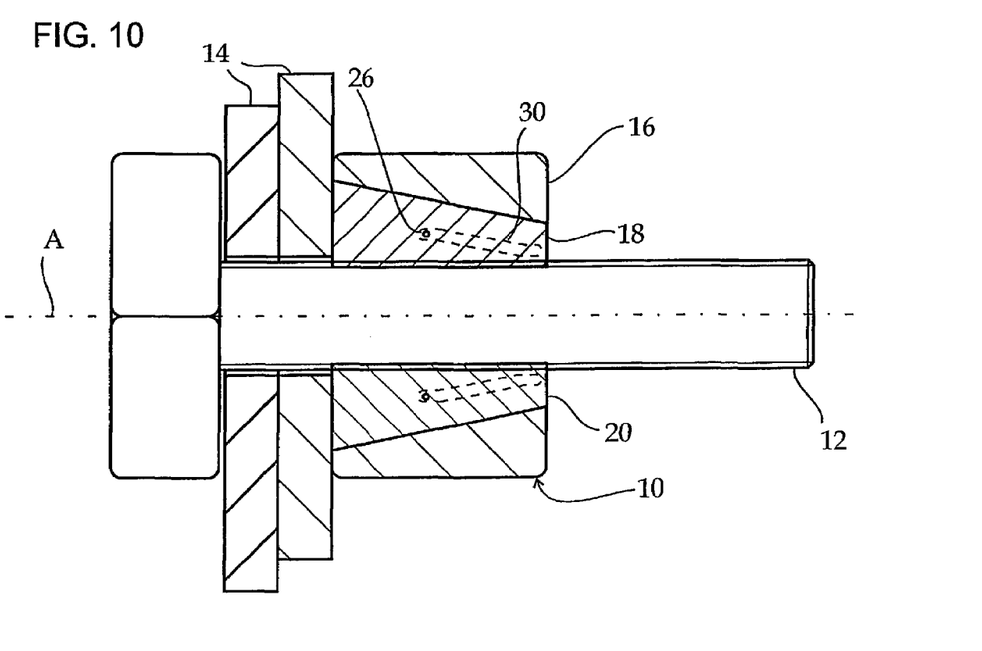
FIG. 10 shows the nut from FIG. 9 with the jaws closed.

The nut 10 is shown in a second embodiment in FIGS. 9 and 10. In contrast to the first embodiment of FIGS. 1 to 5, wedge surfaces 34, 36 are provided in addition corresponding to the first and second guide means 26, 30.

On the one hand an inner wedge surface 34 is provided for each jaw 18, 20 which surface is formed by the port 22 and moves away from the longitudinal axis A in the tightening direction. Inner wedge surface 34 is formed on the upper side of the port 22 pointing down and facing the upper jaw 18, and a second inner wedge surface 34 is formed symmetrically to this on the underside of the port 22 pointing up facing the lower jaw 20.

On the other hand an outer wedge surface 36 is provided on each jaw 18, 20, which surface is formed corresponding to the respective opposite inner wedge surface 34 and so moves away from the longitudinal axis A in the tightening direction. An initial outer wedge surface 36 is formed on the upper side of the upper jaw 18, and a second outer wedge surface 36 is formed symmetrically to this on the underside of the lower jaw 20.

The corresponding inner and outer wedge surfaces 34, 36 are formed in such a way that, when the nut 10 is closed, they match each other exactly, as can be seen clearly in FIG. 9, and their oblique position relative to the longitudinal axis A is in terms of the oblique position of the grooves 30 such that they can be moved past each other when the outer body 17 is moved relative to the inner body 18, 20 for opening and closing the nut 10. When the nut 10 is closed, friction locking therefore occurs between the inner and outer wedge surfaces 34, 36 so that the outer body 16 is held on the inner body 18, 20.

Figure 11:
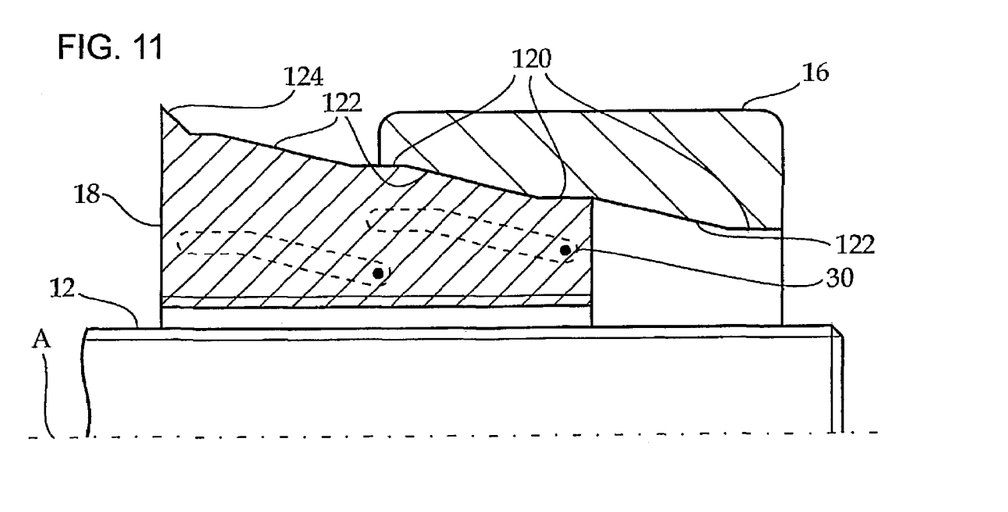
FIG. 11 is a cut lateral view of a nut in a third embodiment with the jaws opened.
Figure 12:
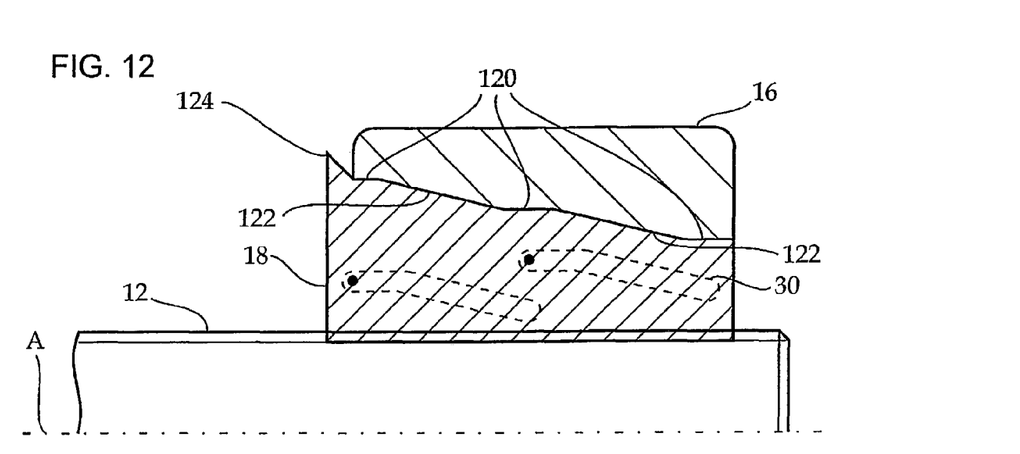
FIG. 12 shows the nut from FIG. 11 with the jaws closed.

In FIGS. 11 and 12 the nut 10 is shown in a third embodiment which represents a modification of the second embodiment of FIGS. 9 and 10. Here, the wedge surfaces 36, 36 are sub-divided into five sections, namely into three section 120 parallel to the longitudinal axis A and two oblique sections 122 which move away from the longitudinal axis A in the tightening direction and are located between the three parallel sections 120. Fewer or more than three parallel sections 120 and/or fewer or more than two oblique sections 122 can also be provided. The grooves 30 run correspondingly parallel to the central parallel section 120 and the right-hand, oblique section 122 connecting to it to the right.

In the closed state of FIG. 12 the outer wedge surface 36 abuts with its parallel sections 120 the corresponding, parallel sections 120 of the inner wedge surface 34, whilst with its oblique sections 122 it may optionally abut the corresponding oblique sections 122 of the inner wedge surface 34 as shown in FIG. 12 or may also be at a distance to these. The sections 120 lying parallel to one another absorb the forces directed radially outwards and which, when the nut 10 is closed, are transmitted from the outer thread of the threaded shaft 12 via the internal thread segments 24 to the jaws 18, 20. As these parallel 120 sections lie at right angles to these radial forces, only one radial component is transmitted to the outer body 16, but not an axial component directed in the loosening direction, as is the case with the oblique wedge surfaces 34, 36 of the second embodiment. However, this axial component may, if it is of sufficient magnitude, lead to the outer body 16 slipping away relative to the inner body 18, 20, accidentally causing the nut 10 to loosen. This is prevented therefore by the parallel sections 120.

Although the wedge surfaces 34, 36 shown in FIGS. 9 to 12 are flat here, they may also be bent as desired in an axial direction and/or in a peripheral direction.

In accordance with FIGS. 11 and 12 a flange 124 projecting radially outwards is provided on the left-hand outer edge of the jaws 18, 20 such that when the nut 10 is closed a gap is formed between the right-hand edge of the edge and the left-hand face surfaces of the outer body 16. The blade of a screwdriver can be placed in this gap, for example, and turned, in order to lift the nut 10 if the outer body 16 is so firmly seated on the inner body 18, 20 that it cannot be pulled away using the fingers. This flange 124 is also suitable for all other embodiments of the nut 10.

The aforementioned, accidental slipping of the outer body 16 relative to the inner body 18, 20 in the loosening direction can also be prevented or at least rendered more difficult by the following measures shown in FIGS. 13 to 16.

Figure 13:
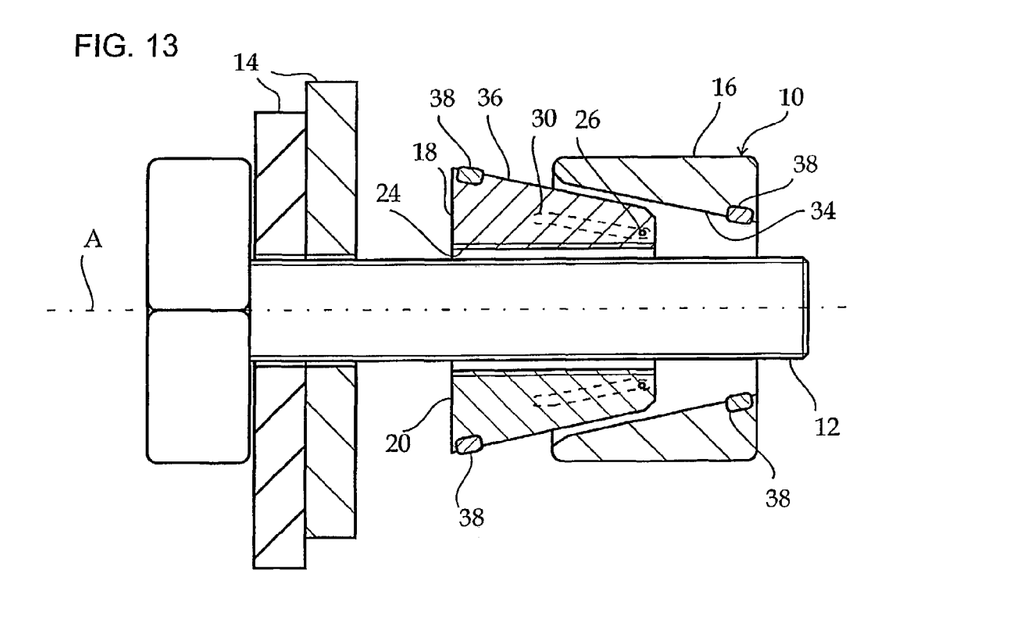
FIG. 13 is a cut lateral view of a nut in a fourth embodiment.

For example, therefore, and in accordance with FIG. 13 in which the nut 10 of FIGS. 9 and 10 is shown in a modified, fourth embodiment, a clamping body 38 can be fitted on the right-hand end of the inner wedge surface 34 and/or on the left-hand end of the outer wedge surface 36, which clamping body projects from the corresponding wedge surface 34, 36 and which is made from a ductile material such as rubber or silicone. If the outer body 16 is pushed out of the position shown in FIG. 13 relative to the jaws 18, 20 and further to the left, the left-hand end of the inner wedge surface 34 and the right-hand end of the outer wedge surface 36 are forced under the right-hand clamping body 38, so that the clamping bodies 38 are distorted and increase the friction between the inner and outer wedge surfaces 34, 36. The left-hand edge of the inner wedge surface 34 and the right-hand edge of the outer wedge surface 36 are preferably chamfered in doing so, in order to be able to push these wedge surfaces 34, 38 more easily into the clamping bodies 38.

Figure 14:
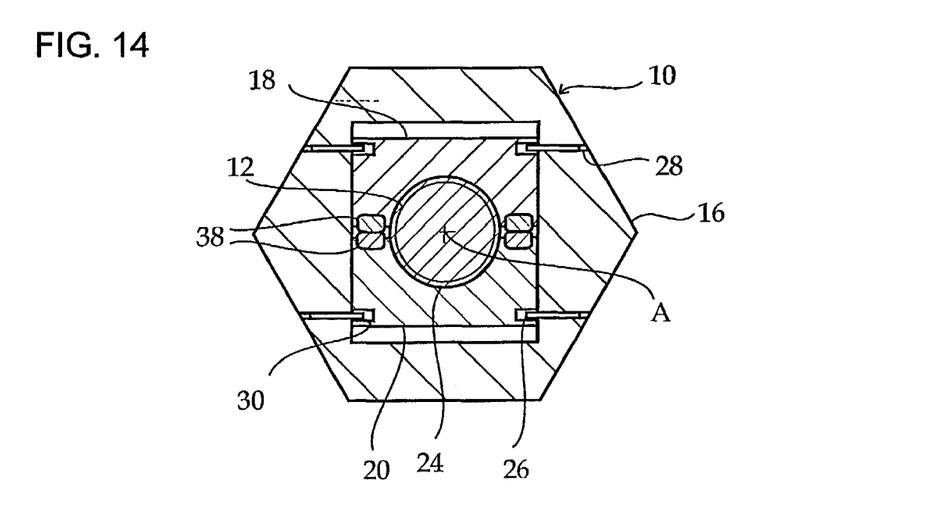
FIG. 14 is a cross-section through a nut in a fifth embodiment.

In accordance with FIG. 14, in which the nut is shown in a fifth embodiment, clamping bodies 38 may also be fitted to the upper jaw 18 and/or the lower jaw 20, which are nipped between these jaws 18, 20 when the nut 10 is closed. As a result the jaws 18, 20 are pressed radially outwards, so that in the case of the second embodiment of FIGS. 9 and 10 and the third embodiment in FIGS. 11 and 12 the friction is increased between the inner and outer wedge surface 34, 36 and in the case of the first embodiment of FIGS. 1 to 4 the friction is increased between the noses 26 and the radially outer surfaces of the grooves 30.

Figure 15:
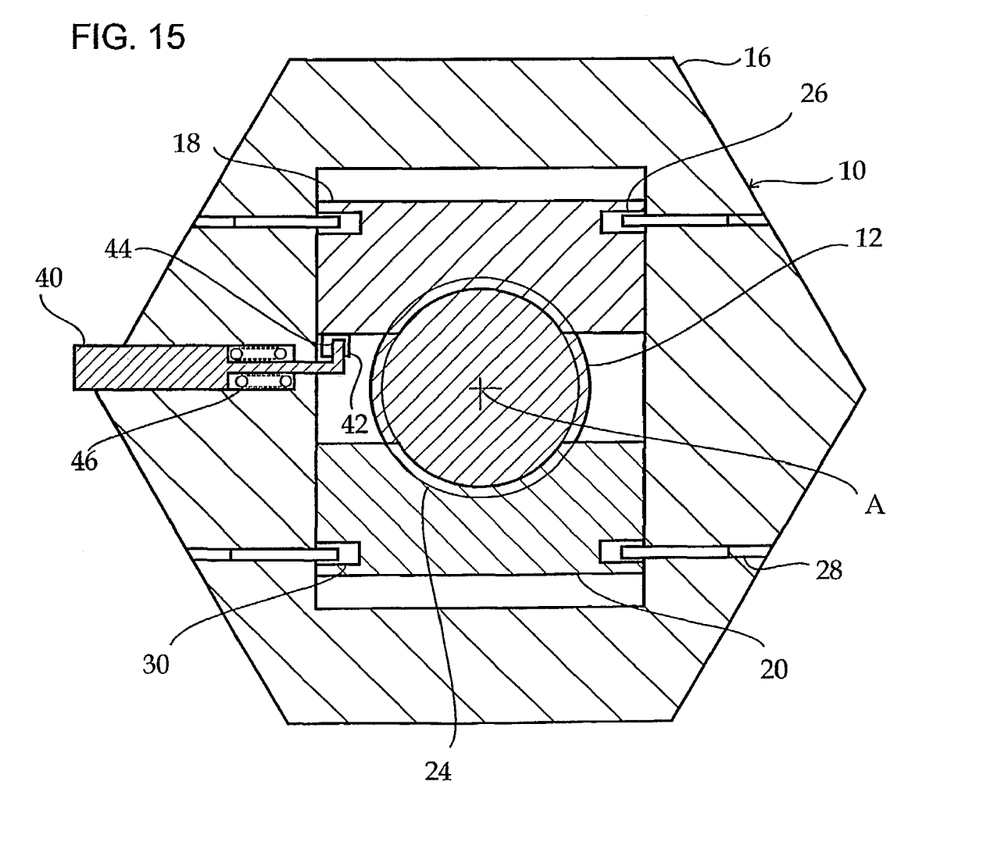
FIG. 15 is a cross-section through a nut with a locking device in an initial embodiment.
Figure 16:
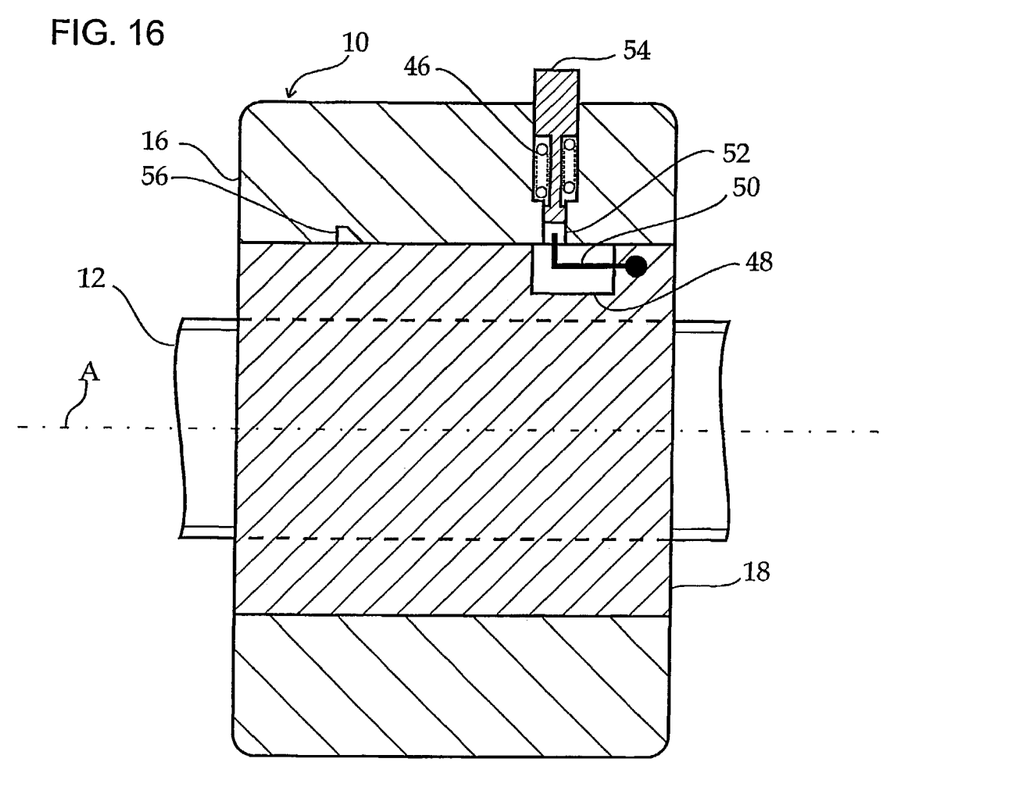
FIG. 16 is a cut plan view of a nut with a locking device in a second embodiment.

In FIGS. 15 and 16 the nut 10 of FIG. 4 is shown with a locking device which prevents the outer body 16 from being capable of being moved relative to the inner body 18, 20 in the loosening direction when the nut 10 is closed.

The locking device in an initial embodiment in accordance with FIG. 15 has a locking pin 40 which is movably guided transversely to the longitudinal axis A in a through-hole by the outer body 16 and projects with its inner end from the through-hole 22. A locking surface 42 is also provided on the upper jaw 18 which surface points transversely to the longitudinal axis A in the tightening direction. This locking surface 42 is here part of a projection which projects downward at the left-hand edge of the lower side of the upper jaw 18 and ends above the upper side of the locking pin 40. The inner end of the locking pin 40 bears an extension 44 bent upwards which abuts the locking surface 42 when the locking pin is in the locked position. If the locking pin 40 is now pushed out of the position shown in FIG. 15 radially inwards into its release position, the extension 44 is also moved radially inwards until it lies next to the locking surface 42 to the right in FIG. 15 and so can be pushed inside past this surface and together with the outer body 16 into the loosening direction.

The locking pin 40 is pre-stressed radially outwards by a helical spring 46, in other words into the locking position, which surrounds a thinner central section of the locking pin 40 and together with the locking pin 40 sits in the through-hole. The helical spring 46 is supported by its radial, inner end on a shoulder of a through-hole and by its radial, outer end on a shoulder of the locking pin 40, as can be clearly seen in FIG. 15.

FIG. 16 shows the locking device in a second embodiment. With this second embodiment the upper jaw 18 has a recess 48 at the right-hand end of its lateral surface pointing upwards in FIG. 16 and which accepts an L-shaped spring plate 50. The axial side of this spring plate 50 is secured in the right-hand wall of the recess 48, and the radial side of the spring plate 50 is directed outwards and projects in the relaxed state of the spring plate 50 from the lateral surface of the jaw 28. In the closed state shown in FIG. 16 of the nut 10 the free end of this radial side projects into a through-hole 52 in the outer body 16. In this locking position as a result the outer body 18 is prevented from moving relative to the jaw 18 in the loosening direction, in other words to the right in FIG. 16. The left-hand edge of the through-hole 52 then comes into contact with the radial side and pushes this still deeper into the through-hole 52, bending the axial side radially upwards. This left-hand edge of the through-hole 52 therefore has the same function as the locking surface 42 of the first embodiment of the locking device.

In order to bring the spring plate 50 into the release position, a release pin 54 is arranged in the through-hole which, like the locking pin 40 in FIG. 15, is pre-stressed radially outwards by a helical spring 46 and projects with its outer end from the outer body 16. If the release pin 54 is now pressed radially inwards, its inner end then pushes the radial side of the spring plate 50 out of the through-hole 52, the axial side bending elastically and radially inwards. As soon as the radial side no longer projects into the through-hole 52 the outer body 16 can be pushed into the loosening direction.

A blind hole 56 is provided in the outer body 16 further to the left next to the through-hole 52 and into which the radial side engages when the outer body 16 is pushed in the loosening direction until the internal thread segments 24 no longer engage with the outer thread of the threaded shaft 12.

If the nut 10 is pushed in this opened state in the tightening direction onto the threaded shaft 12, then the radial side engaged in the blind hole 56 prevents the outer body 10 from being pushed onto the inner body 18, 20, if an internal thread segment 24 is accidentally caught on the threaded shaft 12.

If, finally, the nut 10 cannot be pushed any further in the tightening direction onto the threaded shaft 12, because the inner body 18, 20 is with its left-hand face surface striking the items 14 (FIG. 3) to be screwed together, then the radial side is pressed out of the blind hole 56. In order to facilitate this, the right-hand wall of the blind hole 56 is tilted downwards and to the right in accordance with FIG. 16.

With this second embodiment of the locking device the release pin 54 can also be dispensed with. In order then to be able to bring the radial side engaged in the through-hole 52 into the release position, the left-hand wall of the through-hole 52 can then be tilted downward and to the left (not shown), as described for blind hole 54. If the outer body 16 is now pulled into the loosening direction with sufficient force, the radial side abutting the tilted wall is turned radially inwards until it no longer projects into the through-hole 52 and the outer body 16 can continue to be pulled away unhindered relative to the inner body 18, 20.

Each locking device in FIGS. 15 and 16 is not only suitable for nuts 19 with radially movable jaws 18, 20, as they are the object of this invention, but also for the known nuts with swivelling jaws as they are described, for example in DE 40 24 784 A1 and FR 2 640 336 A1. This also applies to the clamping bodies in FIGS. 13 and 14.

Both the locking pin 40 in FIG. 15 and the release pin 54 in FIG. 16 project in their locking position with their outer end from the outer body 16, so that the user can push them in with one finger for loosening. However, in order to prevent them from being accidentally pushed in, these outer ends may in the locking position also lie countersunk in the corresponding through-hole. For loosening a tool is then required, pincers for example, with a tooth which fits in the through-hole and with which the locking pin 40 respectively the release pin 54 can be pushed in.

Figure 17:
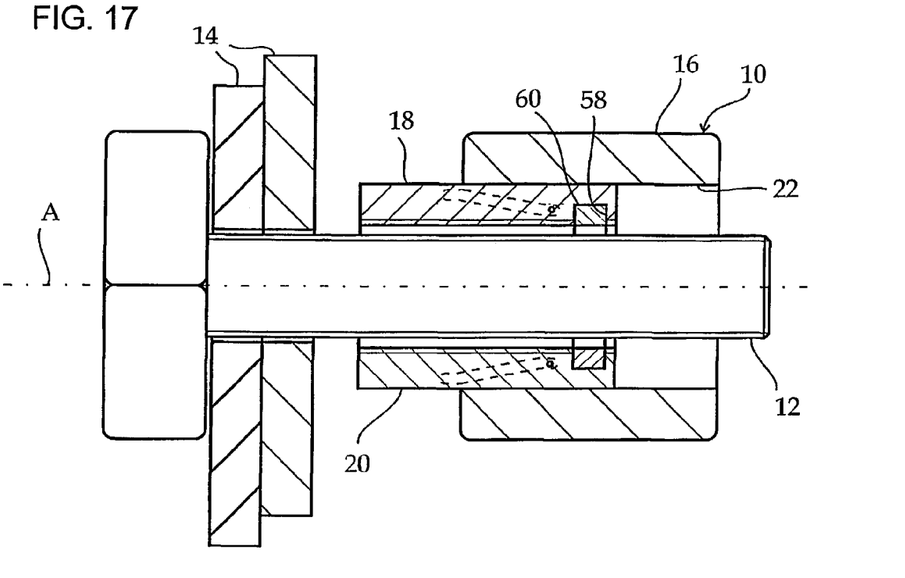
FIG. 17 is a cut lateral view of a nut in a sixth embodiment.

The nut 10 in a sixth embodiment is shown in FIG. 17. With this embodiment the jaws 18, 20 have a threadless recess 58 on their right-hand end in connection with their internal thread segment 24 and in which a bent insert 60 made of ductile material such as plastic sits. When the jaws 18, 20 are closed the outer thread of the threaded shaft 12 pushed into these inserts 60, achieving self-locking of the nut 10 in the closed state to protect against accidental undoing.

Figure 18:
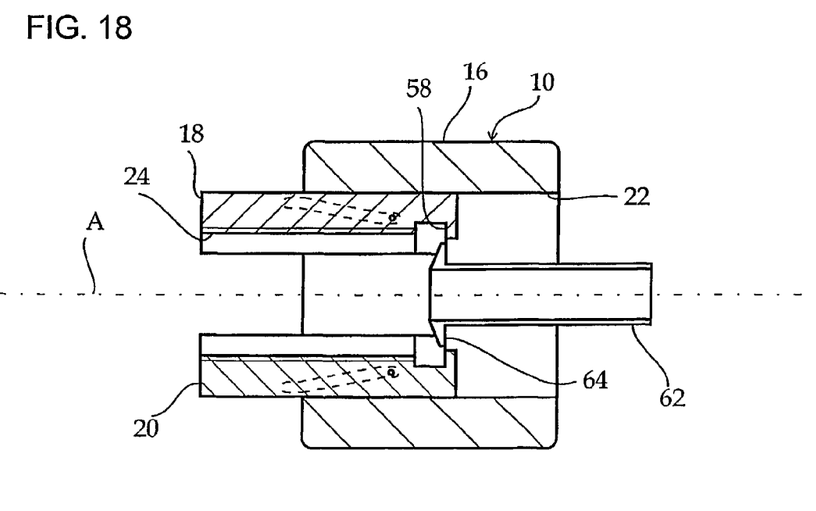
FIG. 18 is a cut lateral view of a nut in a seventh embodiment.

The nut 10 is shown in FIG. 18 in a seventh embodiment. This nut 10 is intended for use on flanged pipes 60 which bear a flared flange 64 at their ends. With this seventh embodiment and similar to the sixth embodiment a recess 58 is provided at the right-hand end of the jaws 18, 20 into which the nut 10 of the flared flange 64 fits in the closed state. In the illustrated, closed state of the nut 10 the jaws 10, 20 are moved apart from one another until the flared flange 64 can be pulled to the right in FIG. 18 and out of the recess 58. This is necessary when, for example, nuts 10 seated on the flanged pipe 62 have to be replaced.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A nut comprising: an outer body which has an axial port;
   and inner body, which is movably accepted in the port in an axial direction, has an axial internal thread and is divided into at least two jaws in an axial direction, which jaws bear an internal thread segment of said internal thread on their radially inner surface and which, when the outer body is moved relative to the inner body in the loosening direction of the nut are moved apart;
   initial means for guiding provided on the outer body; and
   second means for guiding provided on the jaws which interact with the initial guide means such that the jaws are closed, when the outer body is moved relative to the inner body in the tightening direction of the nut, characterized in that:
   the second means for guiding interacts with the initial means for guiding such that the jaws when the outer body is moved relative to the inner body in the loosening direction, are pushed radially outwards and, when the outer body is moved in the tightening direction relative to the inner body, are pushed radially inwards.

2. The nut of claim 1 characterized in that the second means for guiding comprise grooves, which run in lateral surfaces of the jaws and move away from an axis in the tightening direction, and in that the initial means for guiding comprise noses, which project from the port and run in the grooves.

3. The nut of claim 2 wherein on each jaw an outer wedge surface, which moves away from the axis in the tightening direction, and at the port for each jaw an inner wedge surface is provided, which, corresponding to the assigned, outer wedge surface moves away from the axis in the tightening direction.

4. The nut of claim 2 wherein the nut includes a locking pin and a locking surface, wherein the locking pin has a locked position and a released position, and the outer body has an outer peripheral surface;
   the locking pin having an outer end, wherein in the locked position, the locking pin projects from the outer peripheral surface of the outer body.

5. The nut of claim 4 wherein the pin is moveable from the locked position to the released position.

6. The nut of claim 5 wherein the locking pin is biased into the locked position.

7. The nut of claim 1 characterized in that the jaws are pre-stressed radially outwards.

8. The nut of claim 1 wherein a locking pin is movably guided transversely to the axis through the outer body and in its locking position with its inner end abutting a locking surface, which is provided at at least one of said jaws transversely to the axis pointing in the tightening direction, and in its release position can be moved with its inner end past this locking surface and together with the outer body in the loosening direction.

9. The nut of claim 8 wherein the outer end of the locking pin in the locking position projects from the outer peripheral surface of the outer body and the inner end of the locking pin and the locking surface are formed such that the locking pin can be brought out of the locking position into the release position by pressing in.

10. The nut of claim 8 wherein the locking pin is pre-stressed into the locking position.

* * * * *